(No Model.)
A. W. WHITE.
SPRAY PUMP.
No. 417,961. Patented Dec. 24, 1889.
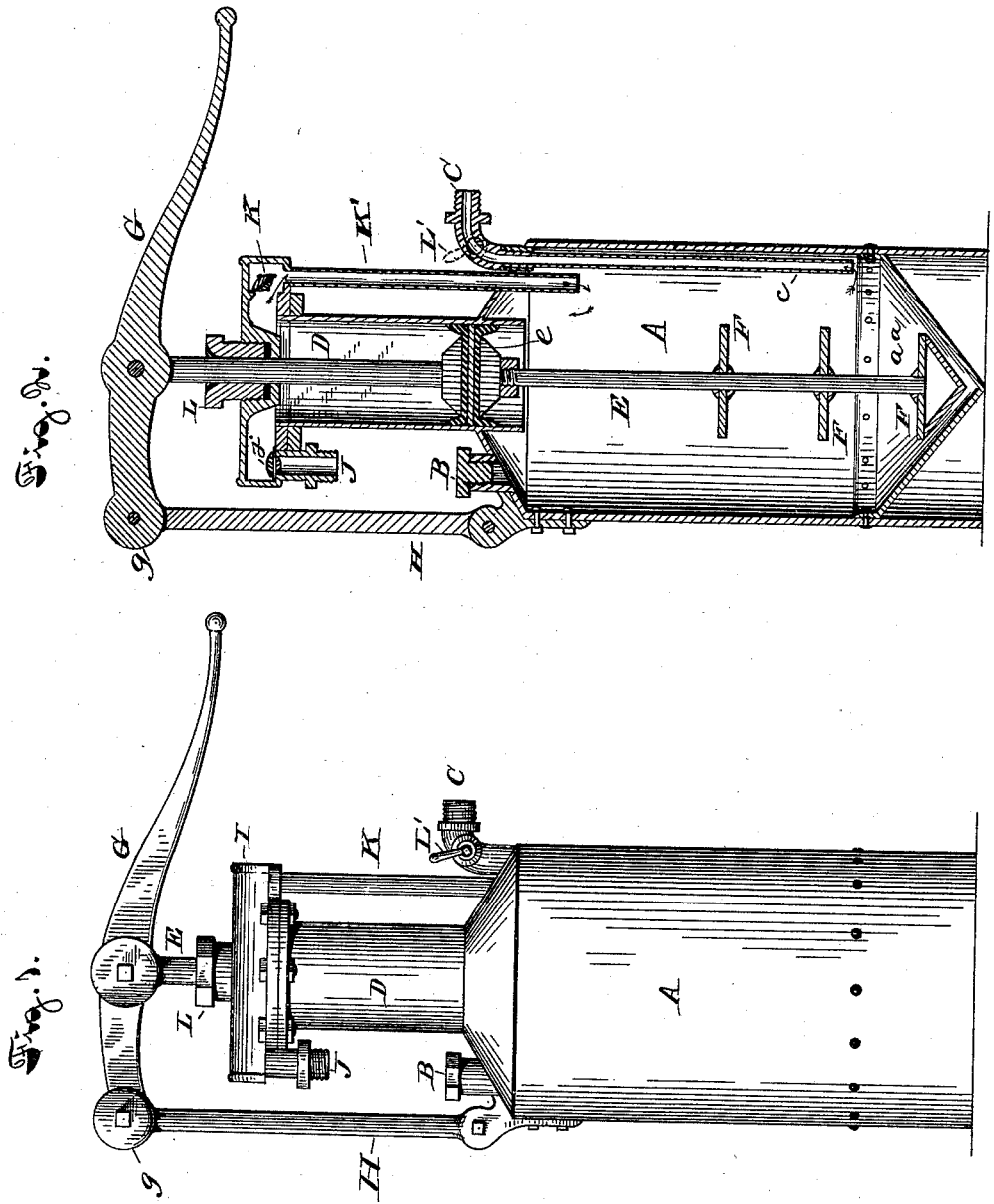
Witnesses
H. D. Nealy
T. W. Fowler
Inventor
Archibald W. White,
By his Attorneys
A. H. Evans & Co.

UNITED STATES PATENT OFFICE.

ARCHIBALD WATSON WHITE, OF SAN JOSÉ, CALIFORNIA.

SPRAY-PUMP.

SPECIFICATION forming part of Letters Patent No. 417,961, dated December 24, 1889.

Application filed April 29, 1889. Serial No. 309,014. (No model.)

*To all whom it may concern:*

Be it known that I, ARCHIBALD WATSON WHITE, a citizen of the United States, residing at San José, in the county of Santa Clara and State of California, have invented certain new and useful Improvements in Spray-Pumps, of which the following is a full and clear description, reference being had to the accompanying drawings, forming a part of this specification, in which—

Figure 1 is a side elevation of my improved pump, and Fig. 2 is a vertical section through the same.

My present invention relates to that class of pumps used more particularly for spraying trees and plants; and it consists in the combination and arrangement of the devices hereinafter explained and claimed.

To enable others skilled in the art to make and use my invention, I will proceed to describe the exact manner in which I have carried it out.

In the drawings, A represents the receiving-tank provided with an inverted-cone-shaped bottom $a$ $a$, for a purpose hereinafter explained. On one side of the top I place the charging-cap B, through which the tank may be filled with any desired fluid mixture. To the opposite side is attached the discharging-nozzle C, provided with the discharging-pipe $c$, leading up from a point near the bottom of the tank, as shown in Fig. 2.

D is a cylinder opening into the receiving-tank, and thus giving the piston-head $e$ the full pressure of the receiving-tank. The piston-rod E, on the downstroke of the piston, extends to the bottom of the tank A, and is provided with the agitators F F F, which move up and down with each stroke of the pump and serve to keep the fluid mixture in the tank in constant agitation and thoroughly mixed up. To the top of the piston-rod I attach the pivoted lever-handle G, having its fulcrum at $g$ attached to the top of the bar H, in turn securely attached to the side of the tank, as shown in Fig. 2. Upon the top of the cylinder D, I secure the hollow cap I, provided with the air-supply pipe J, with a suitable valve $j$, for the admission of the air, and a valve K, for the escape of the air through the pipe K' into the tank A, as shown in Fig. 2.

L is a stuffing-box around the piston-rod, and L' is a stop-cock to regulate the escape of the fluid.

Having thus described my invention, what I claim as new, and desire to secure by Letters Patent, is—

1. In a spray-pump, the tank A, provided with an inverted conical bottom, a charging-cap, and a discharging-nozzle, in combination with the cylinder D, entering into the tank, the piston-rod E, provided with the head $e$, and agitators F, all constructed and arranged substantially as and for the purpose set forth.

2. An improved spray-pump consisting of a tank having an inverted conical bottom, the cylinder let into the tank and having a piston and piston-rod working within it, a hollow cap having valve-controlled passages for the ingress and egress of air, and agitators on the piston within the tank, substantially as described.

ARCHIBALD WATSON WHITE.

Witnesses:
WILLIAM L. NICOL,
J. E. BROWN.